US005677412A

United States Patent [19]

Drysdale

[11] Patent Number: 5,677,412
[45] Date of Patent: *Oct. 14, 1997

[54] PREPARATION OF POLY(ETHER-URETHANES) FROM CYCLIC ETHERS AND ORGANIC ISOCYANATES

[75] Inventor: Neville Everton Drysdale, Newark, Del.

[73] Assignee: E. I. Du Pont de Nemours and Company, Wilmington, Del.

[*] Notice: The term of this patent shall not extend beyond the expiration date of Pat. No. 5,430,122.

[21] Appl. No.: 618,217

[22] Filed: Mar. 19, 1996

Related U.S. Application Data

[63] Continuation-in-part of Ser. No. 387,538, Feb. 13, 1995, abandoned, which is a continuation-in-part of Ser. No. 198,799, Feb. 17, 1994, Pat. No. 5,430,122.

[51] Int. Cl.$^6$ .................... C08G 18/22; C08G 18/24; C08G 18/26; C08G 18/08
[52] U.S. Cl. .................... 528/55; 528/44; 528/48; 528/56; 528/58; 528/73; 560/24; 560/26; 560/115; 560/157; 560/158; 560/330; 560/355; 560/358; 560/359; 560/360
[58] Field of Search .................... 528/55, 56, 58, 528/48, 73, 44; 560/24, 26, 115, 157, 158, 330, 355, 358, 359, 360

[56] References Cited

U.S. PATENT DOCUMENTS

| | | | |
|---|---|---|---|
| 3,842,019 | 10/1974 | Kropp | 528/87 |
| 4,220,731 | 9/1980 | Zuppinger | 521/156 |
| 4,237,252 | 12/1980 | Newell et al. | 525/454 |
| 4,614,786 | 9/1986 | Goel et al. | 528/60 |
| 4,705,838 | 11/1987 | Goel | 528/48 |
| 5,084,586 | 1/1992 | Farooq | 556/181 |
| 5,124,417 | 6/1992 | Farooq | 526/90 |
| 5,430,122 | 7/1995 | Drysdale | 528/55 |
| 5,478,920 | 12/1995 | Drysdale | 528/410 |

FOREIGN PATENT DOCUMENTS

WO88/02661  4/1988  WIPO.

OTHER PUBLICATIONS

Harada, K. et al, *Die Makromolekulare Chemie*, 1132, 281–284 (1970).

Olah, G.A. et al, "Cationic Ring–Opening Polymerization of Tetrahydrofuran with Boron, Aluminium, and Gallium Tristriflate", *J. Applied Poly. Sci.*, 45, 1355–1360 (1992).

Hrkach, J.S. et al, "Cationic Polymerization of Tetryhydrofuran Initiated by Trimethylsilyl Trifluoromethanesulfonate", *Macromolecules*, 23, 4042–4046 (1990).

*Primary Examiner*—Rabon Sergent

[57] ABSTRACT

Poly(ether-urethanes) can be made from cyclic ethers and organic isocyanates by using selected metal compounds as catalysts. Polymers useful as thermoplastic elastomers, spandex fibers or urethane rubbers can be made by reacting diisocyanates containing functional groups with a tetrahydrofuran, especially tetrahydrofuran itself. The invention also discloses an improved process for the cationic polymerization of a cyclic ether by using an organic isocyanate.

39 Claims, No Drawings

PREPARATION OF POLY(ETHER-URETHANES) FROM CYCLIC ETHERS AND ORGANIC ISOCYANATES

CROSS-REFERENCE TO RELATED APPLICATIONS

This application is a continuation-in-part of U.S. application No. 08/387,538 filed Feb. 13, 1995, now abandoned, which is, in-turn, a continuation-in-part of U.S. application No. 08/198,799 filed Feb. 17, 1994, now U.S. Pat. No. 5,430,122.

FIELD OF THE INVENTION

This invention concerns the preparation of poly(ether-urethanes) by polymerization of cyclic ethers and organic isocyanates catalyzed by metal compound catalysts. The resulting products, particularly those made from diisocyanates containing other functional groups are useful as thermoplastic elastomers, urethane rubbers and spandex fibers, or if made with monoisocyanates as intermediates for oligomer diols.

BACKGROUND OF THE INVENTION

Polymers, particularly segmented copolymers of polytetrahydrofurans (usually as the diols) and polyesters or poly(urea-urethanes) are commonly used in commercial products, such as thermoplastic elastomers (Hytrel® thermoplastic elastomer), spandex fibers (Lycra® spandex fiber) and urethane rubbers (Adiprene® urethane rubber). The usual procedure in making these products is to combine a polyether diol with suitable reactants, such as ester segment forming compounds, or urea and/or urethane forming compounds such as amines and/or diols with diisocyanates. Improved methods of making such commercially important polymers are sought by the artisan. Polyether oligomer diols are important "monomeric" intermediates in many polymers, such as polyurethanes.

U.S. Pat. No. 3,842,019 describes the polymerization of oxiranes and other small ring compounds by a presumed cationic mechanism, using as the catalyst the decomposition products of metal perfluoroalkyl-sulfonates. These catalysts are described as "latent", that is no reaction occurs until the metal salt is decomposed. The reactions reported are relatively slow, even at elevated temperatures.

U.S. Pat. Nos. 5,084,586 and 5,124,417 describe the cationic polymerization of various monomers, including cyclic ethers, using onium cations, whose corresponding anions are fluororalkylsulfatometallates. Onium ion catalyzed cationic polymerizations are well known, and there is no mention in these patents of the use of metal salts not containing onium ions, such as metal triflates, as catalysts for the polymerization of cyclic ethers.

J. S. Hrkach, et al., Macromolecules, vol. 23, p. 4042–4046 (1990) describe the polymerization of tetrahydrofuran using trimethylsilyl trifluoromethane-sulfonate as the initiator. No mention is made of any other triflates as catalysts for this polymerization.

G. A. Olah, et al., J. Appl. Polym. Sci., Vol. 45, 1355–1360 (1992) describe the use of boron, aluminum and gallium tristriflate to catalyze the polymerization of THF.

SUMMARY OF THE INVENTION

This invention concerns a process for the production of poly(ether-urethanes), comprising, contacting a cyclic ether selected from the group consisting of oxirane, oxetane, tetrahydrofuran, 1,3-dioxolane, 1,3,5-trioxane, and oxepane, an organic isocyanate of the formula $A(NCO)_x$ and a catalyst of the formula $MZ_s \cdot Q_t$, wherein:

M is a metal selected from the group consisting of: cobalt, tungsten, vanadium, niobium, mischmetall, strontium, barium, scandium, yttrium, a rare earth metal, titanium, zirconium, hafnium, chromium, molybdenum, tantalum, rhenium, iron, ruthenium, osmium, rhodium, iridium, palladium, platinum, silver, copper, gold, zinc, cadmium, mercury, aluminum, gallium, indium, thulium, germanium, tin, lead, arsenic, antimony and bismuth;

at least one of Z is an anion of the formula $—OSO_2R^5$, wherein $R^5$ is perfluoroalkyl containing 1 to 12 carbon atoms or part of a fluorinated group wherein the carbon atoms alpha and beta to the sulfonate group are together bonded to at least four fluorine atoms, or tetrafluoroborate, and the remainder of Z is oxo or one or more monovalent anions;

s is 1 when M is silver;

s is 2 when M is strontium, barium, cobalt, copper, rhodium, iridium, palladium, chromium, zinc, cadmium or mercury;

s is 3 when M is scandium, yttrium, a rare earth metal, mischmetall, arsenic, antimony, bismuth, gold, iron, ruthenium, osmium, aluminum, gallium, indium or thulium;

s is 4 when M is titanium, zirconium, platinum, hafnium, molybdenum, germanium, tin or lead; s is 5 when M is rhenium, vanadium, niobium or tantalum;

s is 6 when M is tungsten;

Q is a neutral ligand;

t is 0 or an integer of 1 to 6;

each A is independently an organic radical having x free valencies;

each x is independently 1, 2, 3, 4, 5 or 6; and provided that:

A is bound to isocyanate groups through a carbon atom; and each oxo group present as part of Z is considered to account for 2 of s; and wherein after contact has occurred the resulting product of the polymerization is further contacted with a proton donor to produce a poly(ether-urethane).

It will be understood that "oxo" means a divalent grouping so that when it is present it takes the place of two monovalent s groups. Each "oxo" present as part of Z can account for two of any s or two of each s, except that at least one of Z must be a fluorinated sulfonate anion.

This invention also concerns an improved process for the cationic polymerization of a cyclic ether, wherein the improvement comprises, carrying out the cationic polymerization in the presence of an organic isocyanate provided that a cationic catalyst does not substantially react with or cause substantial side reaction of the organic isocyanate under the process conditions.

DETAILED DESCRIPTION OF THE PREFERRED EMBODIMENTS

In the instant process a cyclic ether is polymerized in the presence of an organic isocyanate of the formula $A(NCO)_x$, wherein A is an organic radical, and wherein A is bound to each isocyanate group through a carbon atom. By "through a carbon atom" is meant that each isocyanate group is bound to a carbon atom which is part of A. "A" may contain any substituent which does not react during, or disturb, the polymerization. Suitable functional groups include halo, ester, amide, urethane, urea, keto, ether, and sulfone, and hydrocarbon based "functional groups" such as olefins, aromatic rings, and acetylenic bonds. Especially preferred functional groups are ester, amide, urethane and urea. The functional groups should be picked so that they don't undergo a reaction with the isocyanate group(s) of the organic isocyanate. Thus, primary and secondary aliphatic amine groups, which react with isocyanate groups, should not be present and are classified as among those groups which interfere with the polymerization.

In preferred isocyanates x is 1 or 2 and in more preferred isocyanates x is 2. If x is more than 2 a branched or crosslinked polyether may result. If x is 2, the polyether will have chain ends which contain a moiety derived from the organic isocyanate. This moiety will be connected to the polyether through a urethane linkage (derived from one of the isocyanate groups) and this moiety may also contain an unreacted isocyanate group. In addition, this polymer may contain polyether segments separated by moieties derived from the organic isocyanate, and bound to the polyether segments through urethane linkages. Useful organic isocyanates include, but are not limited to, butyl isocyanate, phenyl isocyanate, hexyl isocyanate, benzyl isocyanate, 1,3-phenylenediisocyanate, 1,4-phenylenediisocyanate, 2,4-toluenediisocyanate, 2,6-toluenediisocyanate, bis(4-isocyanatophenyl)methane (MDI), bis(4-isocyanatocyclohexyl)methane and 1,6-diisocyanatohexane. Preferred isocyanates are butyl isocyanate, 1,3-phenylenediisocyanate, 1,4-phenylenediisocyanate, 2,4-toluenediisocyanate, 2,6-toluenediisocyanate, 1,6-diisocyanatohexane, bis(4-isocyanatophenyl)methane, and an especially preferred isocyanate is bis(4-isocyanatophenyl)methane.

The catalyst may be a yttrium or rare earth compound of the formula $MZ_3$ where M is a trivalent ion of yttrium, or one of the rare earths, lanthanum, cerium, praeseodymium, neodymium, promethium, samarium, europium, gadolinium, terbium, dysprosium, holmium, erbium, thulium, ytterbium, and lutetium.

Preferred metals, M, art strontium, scandium yttrium, the rare earth metals, titanium, zirconium, hafnium, vanadium, niobium, tantalum, chromium, molybdenum, tungsten, rhenium, iron, ruthenium, palladium, copper, gold, zinc, tin and bismuth. More preferred metals are yttrium, the rare earth metals, and scandium. Especially preferred metals are yttrium, ytterbium, dysprosium, erbium, neodymium, lanthanum, and scandium. Another preferred metal is "mischmetall" (sometimes also called "didymium"), which is a mixture of rare earth metals as obtained from the ore.

Generally speaking, any metallic compound in which the correct metal in the correct oxidation state (see above) is present and bonded to a triflate or a similar anion will be a catalyst. Such a compound must of course be reasonably stable during the polymerization or decompose to another compound which is still a triflate (or similar anion) compound of the metal in the correct oxidation state.

The metal catalysts may optionally contain one or more neutral ligands, Q, coordinated to the metal. By a neutral ligand is meant a neutral compound that can coordinate with the catalysts, usually the metal cation. Neutral ligands include water, and ethers such as dimethyl ether and tetrahydrofuran. Useful compounds containing neutral ligands include bis(n-cyclopentadienyl)tetrahydrofuran-bis(trifluoromethanesulfonate)zirconium and bis(n-cyclopentadienyl)tetrahydrofuran-bis(trifluoromethanesulfonate)hafnium.

The metal catalysts may contain other anions (as Z) than triflate and similar anions, and tetrafluoroborate, although at least one of triflate (or similar) or tetrafluoroborate must be present. Some other useful anions are alkoxide, particularly lower alkoxide containing 1 to 4 carbon atoms, acetylaceonate, cyclopentadienide, pentamethylcyclopentadienide, t-butylacetylacetonate, and halide. It is preferred if all of the anions are $—OSO_2R^5$, and more preferred if Z is triflate ($R^5$ is trifluoromethyl).

It is believed that the polymerization of cyclic ethers described herein in the presence of organic isocyanates proceeds by a cationic reaction. The cationic polymerization of certain cyclic ethers are known, in the absence of organic isocyanates (but possibly other types of compounds may be present). Thus, improved cationic polymerizations of cyclic ethers are carried out in the presence of organic isocyanates. These polymerizations may be carried out similarly to other known cationic polymerizations of cyclic ethers, except that an organic isocyanate, as described herein, is present. The conditions under which the polymerization will be carried out, such as temperature, will normally be governed by the usual polymerization conditions for the cationic catalyst chosen. Suitable cationic catalysts include $BF_3$, $AlCl_3$, $BCl_3$, $GaCl_3$, $NbCl_3$, $NbCl_5$ and $FeCl_3$. The cationic catalyst should not substantially react with or cause substantial unwanted (or side) reaction of the organic isocyanate under the process conditions. These types of reactions produce products from the organic isocyanate which are not the "normal" polyethers produced by the polymerization process, and/or products of reactions deliberately run after polymerization. Such normal products include for instance those described by formulas (II)–(V), below. An example of an unwanted or side reaction would be cyclic trimerization of 3 isocyanate groups. Small amounts, say up to 10 mole percent, preferably up to 5 mole percent, and more preferably up to 1 mole percent, of the isocyanate groups present, of such side reactions may be tolerated, particularly within the time frame of the cyclic ether polymerization process.

The molar ratio of cyclic ether to organic isocyanate at the beginning of the polymerization can be about 0.2 to about 100, preferably about 2 to about 15. Generally speaking, the higher the relative molar amount of organic isocyanate present, the greater the incorporation (per cyclic ether unit) of urethane units (from organic isocyanate) will be. The desired amount of urethane present will depend on the organic isocyanate used, and the use of the polymeric product.

In the polymerization processes described herein one or more cyclic ethers, oxiranes, oxetanes, tetrahydrofurans, oxepanes, 1,3-dioxolanes, or 1,3,5-trioxanes are polymerized to form a polyether. Oxirane (more commonly called epoxide) is herein given its usual structure, a saturated three membered ring system containing two carbon atoms and one oxygen atom. Oxetane is also given its common meaning, a saturated four membered ring system containing 3 carbon atoms and one oxygen atom. The term tetrahydrofuran means a saturated 5-membered ring system containing 4 carbon atoms and one oxygen atom. The term 1,3-dioxolane means a saturated 5-membered ring system which contains two oxygen atoms separated by 1 carbon atom. The term 1,3,5-trioxane means a six membered ring system containing 3 oxygen atoms in which the oxygen atoms and carbons atoms are alternated. An oxepane is a saturated 7-membered ring system which contains 6 carbon atoms and 1 oxygen atom.

The terms oxirane, oxetane, oxepane, 1,3-dioxolane, 1,3,5-trioxane, and tetrahydrofuran include compounds containing those ring systems which are substituted with hydrocarbyl or cyclic hydrocarbylene groups containing 1 to 20 carbon atoms. The cyclic hydrocarbylene groups form carbocyclic rings, which include bicyclic, tricyclic, etc. systems. By a cyclic hydrocarbylene group herein is meant a divalent radical containing carbon and hydrogen which is part of a carbocyclic ring.

Preferred cyclic ethers have the formula

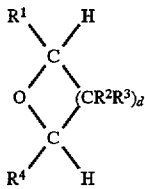 (I)

wherein d is 0, 1, 2 or 4, and each $R^1$, $R^2$, $R^3$ and $R^4$ is independently hydrogen or hydrocarbyl containing 1 to 20 carbon atoms. These cyclic ethers polymerize to give (polymers with) repeat units of the formula —[$CHR^1$($CR^2R^3$)$_d$$CHR^4$O]—. In a more preferred cyclic ether all of $R^1$, $R^2$, $R^3$ and $R^4$ are hydrogen. It is also preferred if d=2. In another more preferred cyclic ether where d=2, $R^1$, one of $R^2$, both of $R^3$ and $R^4$ are hydrogen, and the remaining $R^2$ is alkyl containing 1–4 carbon atoms; it is especially preferred when the remaining $R^2$ is methyl. By hydrocarbyl herein is meant a univalent radical containing carbon and hydrogen.

After the polymerization has taken place, the reaction mass (i.e., the resulting product of the polymerization) is preferably contacted with a proton donor. By a "proton donor" is meant a compound containing one or more relatively acidic protons such as water, an alcohol, such as methanol, a phenol, or a carboxylic acid. It is preferred that the proton donor have a pKa of about 17 or less. It is believed that the proton donor may be the source of the hydrogen atoms attached to the nitrogen atoms of urethane groups formed during the cyclic ether polymerization as shown in Formula II, below.

When a cyclic ether of formula (I) wherein d=2 is used, and x is two, the repeat unit of a segmented poly(ether-urethane) obtained can be represented as

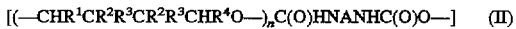 (II)

wherein all of the symbols have the definitions as given above, and n is 1 or more. In preferred polymers, n is about 5 to about 500, more preferably about 8 to about 100. Useful A groups include bis-(3,3'-, 3,4'- and 4,4'-phenylene) methane, p-phenylene, m-phenylene, n-hexamethylene, and alkyl-substituted phenylene. Assuming the end groups of such a polymer are (and usually will be, assuming no reaction of the isocyanate ends) isocyanates derived from the diisocyanate, the formula of the polymer may be represented by

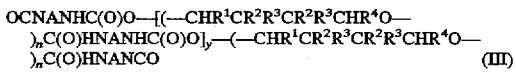 (III)

wherein y is 0 or a number greater than 0. Since this is a condensation polymerization, the art skilled will understand that n and y may be a fractional number since a distribution of molecular weights will be obtained, and y is the average number of "y" segments per polymer molecule and n is the average number of "n" segments per y segment. The molecular weight distribution may be measured by Gel Permeation Chromatography with appropriate standards. In preferred polymers (III), y is greater than 0 and less than about 500, more preferably 1 or more and less than about 200. Determination of the relative amount of "A" group (in other words the diisocyanate incorporated) to the group derived from the tetrahydrofuran can be made by standard analytical methods such as nuclear magnetic resonance spectroscopy, infrared spectroscopy or (particularly if A contains aromatic groups) ultraviolet spectroscopy, again employing appropriate standards as needed.

When a polymer of structure (III) (or any other polymer containing isocyanate end groups) is contacted with a substance that can react with isocyanate groups, a reaction will occur, and the resultant product will become an end group. However, if an approximately equivalent (in terms of remaining isocyanate groups present) amount of a difunctional compound is reacted with (III) a chain extension of (III) will occur. Such difunctional compounds include water, diamines, diols, and aminoalcohols. Water is a particularly preferred chain extension material, since water leads to a urea "linking group" (between the A end groups of two molecules of (III)). This is a particularly preferred group to have if one desires to obtain a chain extended polymer with elastomeric properties. The urea normally forms even if an excess of water is used, and therefore stoichiometry is not as important when water is used, which is an advantage. The repeat unit in a polymer of structure (III) which is chain extended by water is

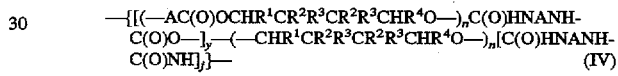 (IV)

wherein all the symbols (except J, see below) are as defined above. The polymeric product when (III) is chain extended by a diamine, diol, or aminoalcohol is

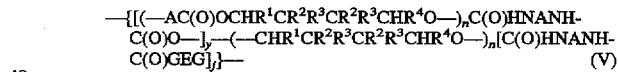 (V)

wherein G is —O— or —$NR^{10}$— and E is hydrocarbylene or substituted hydrocarbylene containing 2 to 30 carbon atoms, and $R^{10}$ is hydrogen or hydrocarbyl containing 1 to 10 carbon atoms, J is 1 or more, and all the other symbols are as defined above. When the functionality reacting with an isocyanate group is an amine, G will be —$NR^{10}$—, and when the isocyanate reacts with a hydroxyl group, G is —O—. In preferred repeat units (V), G is —$NR^{10}$—, and $R^{10}$ is hydrogen. When there is no free (unreacted) diisocyanate in the polymerization mixture after polymerization (when the water, diamine, etc. is added), j is 1. "Free diisocyanate" means that there is unreacted diisocyanate present or additional diisocyanate has been added. However, if there is some excess or remaining diisocyanate present (or some additional diisocyanate is added), the average value of j is greater than 1, depending on the molar ratio of unreacted diisocyanate to isocyanate containing chain ends. It is preferred if j is 1 to 10, or in other words no diisocyanate to 5 moles of diisocyanate per isocyanate equivalent chain end ("molar" amount of chain ends containing isocyanate groups). By hydrocarbylene with regard to E we mean a divalent group containing carbon and hydrogen, which may be substituted with other functional groups which do not interfere in any of the reaction which a compound containing E undergoes. Equivalent amounts of the diamine, diol or aminoalcohol (equivalent of functional groups to isocyanate groups) are preferred when carrying out this reaction.

By "isocyanate chain ends" is meant that at or near the chain ends (depending on how the isocyanate groups are attached to the last molecule of the polymer chain) that isocyanate groups are present. Chain ends are usually considered to be the last molecule or monomer unit on the end of the polymer chain, so, as used herein, that molecule or monomer contains an isocyanate group.

The reactions of the remaining isocyanates (end groups and possibly unreacted diisocyanates remaining) with water, diols, diamines or aminoalcohols can be carried out under conditions in which isocyanate groups normally react with the functional groups, which are known to the artisan. A catalyst for such reactions, such as an organotin compound can be added if desired. See the Examples for typical reaction conditions.

The polymeric products of this invention, particularly those made from diisocyanates, and particularly those containing other functional groups (in A), are useful as thermoplastic elastomers, urethane rubbers or in spandex fibers. Preferred groups within A, particularly when x is 2, are urea and urethane. Those skilled in isocyanate chemistry know how to make such functional diisocyanates. For instance, to make a urea containing diisocyanate, one can add one mole of a diamine to 2 moles of a diisocyanate, thereby producing a material having an average of 2 urea groups per diisocyanate molecule. Diisocyanates containing urethane groups or urethane and urea groups can be made by similar reactions with diols and aminoalcohols, respectively. The urethane of the poly(ether-urethane) products may hydrolyzed to form polyether diols, which are useful as monomers for polymerizations.

In the Examples, the following abbreviations are used:
3-Me-THF - 3-methyltetrahydrofuran
DMAC - N,N-dimethylacetamide
GPC - gel permeation chromatography
MDI - bis(4-isocyanatophenyl)methane
Mn - number average molecular weight
Mw - weight average molecular weight
PD - polydispersity, Mw/Mn
PS - polystyrene
RB - round-bottomed
STD - standard
THF - tetrahydrofuran

EXAMPLE 1

Polymerization of THF with Ytterbium Triflate and 4-Fluorophenyl Isocyanate

In a dry box, ytterbium triflate (5.00 g) was weighed in an oven dried 100 mL RB flask equipped with a stirring bar. The flask was sealed with a rubber septum and removed from the dry box. After the attachment of a nitrogen bleed THF (20.0 mL) was added followed by 4-fluorophenyl isocyanate (3.00 mL). After 150 minutes the polymerization was terminated via the addition of water (10 mL), THF (100 mL) and ether (100 mL). Additional water was added and the resulting organic phase was separated, concentrated at reduced pressure and then dried under vacuum. Polymer yields: 4.97 g. GPC analysis (PS STD): Mn=31700, Mw=70400, PD=2.22. IR analysis (CHCl$_3$, 1 mm NaCl cell, cm$^{-1}$): 3050 (s), 1720 (the urethane stretch), 1550 (s).

EXAMPLE 2

Polymerization of THF with Ytterbium Triflate and 1,6-Hexamethylenediisocyanate

In a dry box, ytterbium triflate (5.00 g) was added to each of three separate oven dried 100 mL RB flasks equipped with stirring bars. The flasks were sealed with rubber septa and removed from the dry box. After the attachment of nitrogen bleeds THF (20.0 mL) was added to each flask. 1,6-Hexamethylenediisocyanate (1, 2 and 4 mL) was then added to each flask. After 60 minutes the polymerizations were terminated via the addition of water (25 mL), THF (50 mL) and ether (25 mL). The resulting organic phases were separated, concentrated at reduced pressure and then dried under vacuum. Polymer yields and GPC analysis:

| 1,6-Hexamethylene-diisocyanate | Polymer Yield (g) | (PS STD) | | |
|---|---|---|---|---|
| | | Mn | Mw | PD |
| 1 mL | 4.46 | 61600 | 100000 | 1.63 |
| 2 mL | 6.19 | 59800 | 105000 | 1.77 |
| 4 mL | 10.00 | 49600 | 87900 | 1.77 |

EXAMPLE 3

Polymerization of THF with Ytterbium Triflate and Phenyl Isocyante

In a dry box, ytterbium triflate (5.00 g) was weighed in an oven dried 100 mL RB flask equipped with a stirring bar. The flask was sealed with a rubber septum and removed from the dry box. After the attachment of a nitrogen bleed THF (20.0 mL) was added followed by phenyl isocyanate (2.00 mL). After 60 minutes the polymerization was terminated via the addition of water (25 mL), THF (50 mL) and ether (25 mL). The resulting organic phase was separated, concentrated at reduced pressure and then dried under vacuum. Polymer yields: 2.77 g. GPC analysis (PS STD): Mn=117000, Mw=211000, PD=1.80. Also 0.519 g of insoluble polymer was obtained which on GPC analysis (PS STD) gave Mn=128000, Mw=201000, PD=1.57.

EXAMPLE 4

Polymerization of THF with Bis (η-cyclopentadienyl)tetrahydrofuran-bis (trifluoromethanesulfonato)zirconium and Butyl Isocyanate In a dry box, bis(η-cyclopentadienyl)tetrahydrofuran-bis (trifluoromethanesulfonato)zirconium (1.8 g) was weighed in an oven dried 100 mL RB flask equipped with a stirring bar. The flask was sealed with a rubber septum and removed from the dry box. After the attachment of a nitrogen bleed THF (10.0 mL) was added followed by butyl isocyanate (3.00 mL). After 90 minutes the polymerization was terminated via the addition of methanol (10 mL). After 15 minutes THF, ether and water were added. The resulting organic phase was separated, concentrated at reduced pressure and then dried under vacuum. Polymer yield: 8.24 g. GPC analysis (PS STD): Mn=26400, Mw=42600, PD=1.61.

EXAMPLE 5

Polymerization of THF with Bis(η-cyclopentadienyl)tetrahydrofuran-bis (trifluoromethanesulfonato)hafnium and Butyl Isocyanate In a dry box, bis(η-cyclopentadienyl)tetrahydrofuran-bis (trifluoromethansulfonato)hafnium (2.0 g) was weighed into an oven dried 100 mL RB flask equipped with a stirring bar. The flask was sealed with a rubber septum and removed from the dry box. After the attachment of a nitrogen bleed THF (10.0 mL) was added followed by butyl isocyanate (3.00 mL). After 90 minutes the polymerization was terminated via the addition of methanol (10 mL). After 15 minutes THF, ether and water were added. The resulting organic phase was separated, concentrated at reduced pressure and then dried under vacuum. Polymer yield: 5.25 g. GPC analysis (PS STD): Mn=51800, Mw=75700, PD=1.46.

EXAMPLE 6

Polymerization of THF with Erbium Triflate and Butyl Isocyanate

In a dry box, erbium triflate (3.0 g) was weighed into an oven dried 100 mL RB flask equipped with a stirring bar. The flask was sealed with a rubber septum and removed from the dry box. After the attachment of a nitrogen bleed THF (10.0 mL) was added followed by butyl isocyanate (3.00 mL). After 90 minutes the polymerization was terminated via the addition of methanol (10 mL). After 15 minutes THF, ether and water were added. The resulting organic phase was separated, concentrated at reduced pressure and then dried under vacuum. Polymer yield: 3.71 g. GPC analysis (PS STD): Mn=42500, Mw=58700, PD=1.38.

EXAMPLE 7

Polymerization of THF with Yttrium Triflate and Butyl Isocyanate

In a dry box, yttrium triflate (3.0 g) was weighed into an oven dried 100 mL RB flask equipped with a stirring bar. The flask was sealed with a rubber septum and removed from the dry box. After the attachment of a nitrogen bleed THF (10.0 mL) was added followed by butyl isocyanate (3.00 mL). After 90 minutes the polymerization was terminated via the addition of methanol (10 mL). After 15 minutes THF, ether and water were added. The resulting organic phase was separated, concentrated at reduced pressure and then dried under vacuum. Polymer yield: 2.4 g. GPC analysis (PS STD): Mn=24400, Mw=45400, PD=1.86.

EXAMPLE 8

Polymerization of THF with Lanthanum Triflate and 1,6-Hexamethylenediisocyanate

In a dry box, lanthanum triflate (5.00 g) was added to each of two separate oven dried 100 mL RB flasks equipped with stirring bars. The flasks were sealed with rubber septa and removed from the dry box. After the attachment of nitrogen bleeds THF (20.0 mL) was added to each flask. 1,6-Hexamethylenediisocyanate (3, and 6 mL) was then added to each flask. After 24 hours the polymerizations were terminated via the addition of trifluoroacetic acid (20 mL), then stirred for 1 hour. Water, THF and ether were then added and the separated organic phase concentrated at reduced pressure and then dried under vacuum. Polymer yields:

| 1,6-Hexamethylene-diisocyanate | Polymer Yield (g) |
|---|---|
| 3 mL | 3.75 |
| 6 mL | 5.66 |

EXAMPLE 9

Polymerization of THF with Yttrium Triflate and 1,6-Hexamethylenediisocyanate

In a dry box, yttrium triflate (5.00 g) was added to each of two separate oven dried 100 mL RB flasks equipped with stirring bars. The flasks were sealed with rubber septa and removed from the dry box. After the attachment of nitrogen bleeds THF (20.0 mL) was added to each flask. 1,6-Hexamethylenediisocyanate (3, and 6 mL) was then added to each flask. After 24 hours the polymerizations were terminated via the addition of trifluoroacetic acid (20 mL), then stirred for 1 hour. Water, THF and ether were then added and the separated organic phase concentrated at reduced pressure and then dried under vacuum. Polymer yields and GPC analysis:

| 1,6-Hexamethylene-diisocyanate | Polymer Yield (g) | (PS STD) | | |
|---|---|---|---|---|
| | | Mn | Mw | PD |
| 3 mL | 5.33 | 55400 | 108,000 | 1.95 |
| 6 mL | 7.63 | 28100 | 60000 | 2.13 |

EXAMPLE 10

Polymerization of THF with Yttrium Triflate and 1,6-Hexamethylenediisocyanate

In a dry box, yttrium triflate (5.00 g) was added to each of four separate oven dried 100 mL RB flasks equipped with stirring bars. The flasks were sealed with rubber septa and removed from the dry box. After the attachment of nitrogen bleeds THF (20.0 mL) was added to each flask. 1,6-Hexamethylenediisocyanate (1, 2, 4 and 8 mL) was then added to each flask. After 4 hours the polymerizations were terminated via the addition of trifluoroacetic acid (20 mL), then stirred for 1 hour. Water, THF and ether were then added and the resulting mixtures filtered through Celite. The filtrates were then concentrated at reduced pressure and then dried under vacuum. Polymer yields and GPC analysis:

| 1,6-Hexamethylene-diisocyanate | Polymer Yield (g) | (PS STD) | | |
|---|---|---|---|---|
| | | Mn | Mw | PD |
| 1 mL | 9.05 | 48200 | 148,000 | 3.08 |
| 2 mL | 12.73 | 35000 | 91600 | 2.61 |
| 4 mL | 15.85 | 24700 | 54900 | 2.22 |
| 8 mL | 14.63 | 17700 | 32500 | 1.84 |

EXAMPLE 11

Polymerization of THF/3-Me-THF with Ytterbium Triflate and MDI in DMAC

In a dry box, ytterbium triflate (5.00 g) and MDI (4.00 g) were weighed into an oven dried 100 mL RB flask equipped with a stirring bar. The flask was sealed with a rubber septum and removed from the dry box. After the attachment of a nitrogen bleed dimethylacetamide (DMAC, 5.00 mL), THF (20.0 mL), and 3-Me-THF (5.0 mL) were added. After 5 hours the polymerization was terminated via the addition of water (10 mL), THF (100 mL) and ether (100 mL). Additional water was added and the resulting organic phase was separated, concentrated at reduced pressure and then dried under vacuum. Polymer yields: 1.88 g. GPC analysis (PS STD): Mn=40000, Mw=95100, PD=2.38.

EXAMPLE 12

Polymerization of THF with Ytterbium Triflate and 2,4-Tolylene Diisocyanate

In a dry box, ytterbium triflate (5.00 g) was added to each of three separate oven dried 100 mL RB flasks equipped with stirring bars. The flasks were sealed with rubber septa and removed from the dry box. After the attachment of nitrogen bleeds THF (20.0 mL) was added to each flask. 2,4-Tolylene diisocyanate (1, 2, and 4 mL) was then added to each flask. After 4 hours the polymerizations were terminated via the addition of methanol (10 mL). Water, THF and ether were added and the resulting organic phase separated, concentrated at reduced pressure and then dried under vacuum. Polymer yields and GPC analysis:

| 2,4-Tolylene Diisocyanate | Polymer Yield (g) | (PS STD) | | |
|---|---|---|---|---|
| | | Mn | Mw | PD |
| 1 mL | 3.05 | 98600 | 182,000 | 1.85 |
| 2 mL | 6.26 | 74900 | 145,000 | 1.94 |
| 4 mL | 9.90 | 60900 | 109000 | 1.79 |

EXAMPLE 13

Polymerization of THF with Ytterbium Triflate and MDI

In a dry box, ytterbium triflate (5.00 g) was added to each of three separate oven dried 100 mL RB flasks equipped with stirring bars. MDI (2.0, 3.0 and 4.0 g) was then added to each flask. The flasks were sealed with rubber septa and removed from the dry box. After the attachment of nitrogen bleeds THF (20.0 mL) was added to each flask. After 4 hours the polymerizations were terminated via the addition of methanol (10 mL). Water and THF were added and the resulting organic phase separated, concentrated at reduced pressure and then dried under vacuum. Polymer yields and GPC analysis:

| MDI (g) | Polymer Yield (g) | (PS STD) | | |
|---|---|---|---|---|
| | | Mn | Mw | PD |
| 2.0 | 6.15 | 87700 | 180000 | 2.06 |
| 3.0 | 6.12 | 84400 | 148000 | 1.76 |
| 4.0 | 7.22 | 70000 | 135000 | 1.93 |

EXAMPLE 14

Polymerization of THF/3-Me-THF with Ytterbium Triflate and MDI

In a dry box, ytterbium triflate (0.5 g) and MDI (4.0 g) were weighed in an oven dried 100 mL RB flask equipped with a stirring bar. The flask was sealed with a rubber septum and removed from the dry box. After the attachment of a nitrogen bleed THF (20.0 mL) and 3-Me-THF (5.0 mL) were added. After 24 hours the polymerization was terminated via the addition of THF and water. The resulting mixture was litered through Celite. The filtrate was concentrate at reduced pressure and then dried under vacuum affording 1.18 g of elastomeric material. GPC analysis (PS STD): Mn=22000, Mw=598000, PD=4.87.

EXAMPLE 21

Polymerization of THF with Ytterbium Triflate and Trans-1,4-diisocyanatocyclohexane In a dry box, ytterbium triflate (2.50 g) and trans-1,4-diisocyanato-cyclohexane were added to each of two separate oven dried 100 mL RB flasks equipped with stirring bars. The flasks were sealed with rubber septa and removed from the dry box. After the attachment of nitrogen bleeds THF (15.0 mL) was added to each flask. After three hours the polymerizations were terminated via the addition of water and THF. The resulting mixtures were then filtered through Celite. The filtrates were concentrated at reduced pressure and then dried under vacuum.

| Trans-1,4-diisocyanatocyclohexane (g) | Polymer Yield (g) |
|---|---|
| 2 | 5.73 |
| 3 | 7.90 |

EXAMPLE 16

Polymerization of THF with Ytterbium Triflate and Dicyclohexylmethane-4,4'-diisocyanate In a dry box, ytterbium triflate (2.50 g) was added to each of two separate oven dried 100 mL RB flasks equipped with stirring bars. The flasks were sealed with rubber septa and removed from the dry box. After the attachment of nitrogen bleeds THF (15.0 mL) was added to each flask followed respectively by dicyclohexylmethane-4,4'-diisocyanate (2.0 and 3.0 mL). After 3 hours the polymerizations were terminated via the addition of water and THF. The resulting mixtures were then filtered through Celite. The filtrates were concentrated at reduced pressure and then dried under vacuum.

| Dicyclohexylmethane-4,4'-diisocyanate (mL) | Polymer Yield (g) |
|---|---|
| 2 | 2.65 |
| 3 | 4.41 |

EXAMPLE 17

Polymerization of THF/3-Me-THF with MDI and Ytterbium Triflate

In a dry box, ytterbium triflate (5.00 g) and MDI (4.00 g) were weighed into an oven dried 100 mL RB flask equipped with a stirring bar. The flask was sealed with a rubber septum and removed from the dry box. After the attachment of a nitrogen bleed, THF (15.0 mL) and 3-Me-THF (5.0 mL) were added. After 4 hours the polymerization was terminated via the addition of water (50 mL), THF (100 mL) and ether (100 mL). The resulting mixture was diluted with THF (500 mL) and additional water added, the aqueous phase was separated and the organic phase filtered through Celite. The filtrate was concentrated at reduced pressure and then dried under vacuum affording 3.1 g of an elastomeric material. A portion of this elastomeric material was dissolved in THF/DMAC and films cast and film properties measured. Instron measurement (Film width: 0.25 inch, Film thickness: 0.0036 inch): Strength at yield: 2665 psi; Strength at maximum: 2815 psi; Strength at break: 2746 psi; Elongation at break (%): 1043; Elongation at maximum (%): 1145; Elongation at break (%): 1176; Modulus (Kpsi): 0.1022; Toughness (in#/in$^3$): 15220.

EXAMPLE 18

Polymerization of THF/3-Me-THF with MDI and Ytterbium Triflate

In a dry box, ytterium triflate (2.50 g) was added to each of 4 separate oven dried 100 mL RB flasks equipped with stirring bars. MDI (1.5, 2.0, 3.0 and 4.0 g) was then added to the flasks. The flasks were sealed with rubber septa and then removed from the dry box. Nitrogen bleeds were attached and THF (10.00 mL) and 3-Me-THF (3.00 mL) were added to each flask. After 15 hours THF (50 mL) was added to each thick polymerized solution, then water (5.0 mL) was added to each solution. After ~15 minutes the resulting mixture was poured into THF (200 mL) and then filtered through Celite. The filtrates were then concentrated at reduced pressure and then dried under vacuum affording elastomeric materials.

| MDI (g) | Polymer Yield (g) |
| --- | --- |
| 1.5 | 5.22 |
| 2.0 | 5.43 |
| 3.0 | 4.90 |
| 4.0 | 5.03 |

EXAMPLE 19

Polymerization of THF/3-Me-THF with MDI and Ytterbium Triflate

In a dry box, ytterium triflate (0.50, 1.0, 1.5 and 2.0 g) was respectively weighed into four separate oven dried 100 mL RB flasks equipped with stirring bars. MDI (2.0 g) was then added to the flasks. The flasks were sealed with rubber septa and then removed from the dry box. Nitrogen bleeds were attached and THF (10.00 mL) and 3-Me-THF (3.00 mL) were added to each flask. After 15 hours THF (50 mL) was added to each viscous polymerized solution, then water (5.0 mL) was added to each solution. After ~15 minutes the resulting mixture was poured into THF (200 mL) and then filtered through Celite. The filtrates were then concentrated at reduced pressure and then dried under vacuum affording elastomeric materials.

| Yb(OTf)$_3$ (g) | Polymer (g) |
| --- | --- |
| 0.5 | 3.01 |
| 1.0 | 3.74 |
| 1.5 | 4.54 |
| 2.0 | 4.82 |

EXAMPLE 20

Polymerization of THF with MDI and Ytterbium Triflate

In a dry box, ytterium triflate (2.50 g) was added to each of four separate oven dried 100 mL RB flasks equipped with stirring bars. MDI (1.0, 2.0, 3.0 and 4.0 g) was then added to the flasks. The flasks were sealed with rubber septa and then removed from the dry box. Nitrogen bleeds were attached and THF (10.00 mL) was added to each flask. After ~15 hours THF (50 mL) was added to each viscous solution, then water (5.0 mL) was added to each solution. After 15 minutes the resulting mixture was poured into THF (400 mL) and then filtered through Celite. The filtrates were then concentrated at reduced pressure and then dried under vacuum affording elastomeric materials.

| Sample | MDI (g) | Polymer Yield (g) |
| --- | --- | --- |
| A | 1.0 | 3.75 |
| B | 2.0 | 5.00 |
| C | 3.0 | 5.23 |
| D | 4.0 | 4.70 |

Films were cast from THF/DMAC (10/1) and then subjected to physical testing as 0.25 in. wide strips (2.54 cm=1 in.):

| Sample | Thickness (in) | Strength at Break (psi) | Elongation at Break (%) | Modulus (Kpsi) |
| --- | --- | --- | --- | --- |
| A | 0.016 | 851 | 923 | 0.0257 |
| B | 0.017 | 803 | 913 | 0.0240 |
| C | 0.0185 | 1088 | 1021 | 0.0262 |
| D | 0.14 | 990 | 991 | 0.0238 |

EXAMPLE 21

Polymerization of THF/3-Me-THF with MDI and Ytterbium Triflate - Terminated with 3,3'-Diaminodiphenymethane In a dry box, ytterbium triflate (5.00 g) and MDI (2.00 g) were weighed into an oven dried 100 mL RB flask equipped with a stirring bar. The flask was sealed with a rubber septum and removed from the dry box. After the attachment of a nitrogen bleed, THF (12.0 mL) and 3-Me-THF (3.0 mL) were added. After 16 hours the polymerization was terminated via the addition of a solution of 3,3'-diaminodiphenymethane (1.0 g in 10 mL THF). After 15 minutes the resulting mixture was diluted to 400 mL with THF, then filtered through Celite. The filtrate was concentrated at reduced pressure and then dried under vacuum affording 5.52 g of elastomeric material.

EXAMPLE 22

Polymerization of THF/3-Me-THF with MDI and Ytterbium Triflate at 45° C.

In a dry box, ytterbium triflate (5.00 g) and MDI (2.00 g) were weighed into an oven dried 100 mL RB flask equipped with a stirring bar. The flask was sealed with a rubber septum and removed from the dry box. After the attachment of a nitrogen bleed, THF (12.0 mL) and 3-Me-THF (3.0 mL) were added and the flask placed in a oil bath maintained at 45° C. After 22 hours the polymerization was diluted with THF (60 mL) and water (10 mL) added. The resulting mixture was diluted to 400 mL with THF and then filtered through Celite. The filtrate was concentrated at reduced pressure and then dried under vacuum affording 4.44 g of elastomeric material.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than the foregoing specification, as indicating the scope of the invention.

What is claimed is:

1. An improved process for the cationic polymerization of a cyclic ether selected from the group consisting of oxetane, tetrahydrofuran, 1,3-dioxolane, 1,3,5-trioxane, and oxepane, wherein the improvement comprises, carrying out the cationic polymerization in the presence of an organic isocyanate, provided that a cationic catalyst does not substantially react with or cause substantial side reaction of the organic isocyanate under the process conditions, so that less than 10 mole percent of the isocyanate groups present react with the cationic catalyst or undergo said side reactions during said polymerization, and a poly(ether-urethane) is produced.

2. The improved process as recited in claim 1 wherein said organic isocyanate is of the formula $A(NCO)_x$, wherein A is an organic radical, each isocyanate group is bound to A through a carbon atom, and x is 2.

3. The improved process as recited in claim 1 wherein said cyclic ether is of the formula

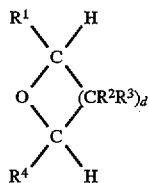

(I)

wherein d is 1, 2 or 4, each $R^1$, $R^2$, $R^3$ and $R^4$ is independently hydrogen or hydrocarbyl containing 1 to 20 carbon atoms.

4. The improved process as recited in claim 3 wherein d is 2.

5. The improved process as recited in claim 3 wherein said organic isocyanate is of the formula $A(NCO)_x$, wherein A is an organic radical, each isocyanate group is bound to A through a carbon atom, and x is 2.

6. The improved process as recited in claim 5 wherein d is 2.

7. The improved process as recited in claim 6 wherein $R^1$, all of $R^2$, $R^4$ and all of $R^3$ are hydrogen.

8. The improved process as recited in claim 6 wherein $R^1$ and $R^4$ are hydrogen, one of $R^2$ is methyl, the other $R^2$ is hydrogen, and both of $R^3$ are hydrogen.

9. The improved process as recited in claim 6 comprising the additional step of reacting remaining isocyanate groups with a diamine, diol, aminoalcohol or water.

10. The improved process as recited in claim 9 wherein water is used.

11. The improved process as recited in claim 4 wherein $R^1$, all of $R^2$, $R^4$ and all of $R^3$ are hydrogen.

12. The improved process as recited in claim 4 wherein $R^1$ and $R^4$ are hydrogen, one of $R^2$ is methyl, the other $R^2$ is hydrogen, and both of $R^3$ are hydrogen.

13. The improved process as recited in claim 2 wherein A is bis(3,3'-phenylene)methane, bis(3,4'-phenylene)methane, bis(4,4'-phenylene)methane, p-phenylene, m-phenylene or methyl-substituted phenylene.

14. The improved process are recited in claim 2 comprising the additional step of reacting remaining isocyanate groups with a diamine, diol, aminoalcohol or water.

15. The improved process as recited in claim 14 wherein water is used.

16. The improved process as recited in claim 1 wherein after the polymerization has taken place the product of the polymerization is contacted with a proton donor to yield the poly(ether-urethane).

17. The improved process as recited in claim 16 wherein the proton donor is selected from the group consisting of water, an alcohol, a phenol, and a carboxylic acid.

18. The improved process as recited in claim 17 wherein the alcohol is methanol.

19. A process for the production of poly(ether-urethanes), comprising, contacting a cyclic ether selected from the group consisting of oxirane, oxetane, tetrahydrofuran, 1,3-dioxolane, 1,3,5-trioxane, and oxepane, an organic isocyanate of the formula $A(NCO)_x$ and a catalyst of the formula $MZ_s \cdot Q_t$, wherein:

M is a metal selected from the group consisting of cobalt, tungsten, vanadium, niobium, strontium, barium, scandium, yttrium, the rare earth metals, titanium, zirconium, hafnium, chromium, molybdenum, tantalum, rhenium, iron, ruthenium, osmium, rhodium, iridium, palladium, platinum, silver, mischmetall, copper, gold, zinc, cadmium, mercury, aluminum, gallium, indium, thulium, germanium, tin, lead, arsenic, antimony and bismuth;

at least one of Z is an anion of the formula $-OSO_2R^5$, wherein $R^5$ is perfluoroalkyl containing 1 to 12 carbon atoms or part of a fluorinated group wherein the carbon atoms alpha and beta to the sulfonate group are together bonded to at least four fluorine atoms, or tetrafluoroborate, and the remainder of Z is oxo or one or more monovalent anions;

s is 1 when M is silver;

s is 2 when M is strontium, barium, copper, cobalt, rhodium, iridium, palladium, chromium, zinc, cadmium or mercury;

s is 3 when M is scandium, yttrium, a rare earth metal, mischmetall, arsenic, antimony, bismuth, gold, iron, ruthenium, osmium, aluminum, gallium, indium or thulium;

s is 4 when M is titanium, zirconium, platinum, hafnium, molybdenum, germanium, tin or lead;

s is 5 when M is rhenium, vanadium, niobium or tantalum;

s is 6 when M is tungsten;

Q is a neutral ligand;

t is 0 or an integer of 1 to 6;

each A is independently an organic radical having x free valencies;

each x is independently 1, 2, 3, 4, 5 or 6; and provided that:

A is bound to isocyanate groups through a carbon atom; and each oxo present as part of Z is considered to account for two of s;

and wherein after contact has occurred the resulting product of the polymerization is further contacted with a proton donor to produce poly(ether-urethane).

20. The process as recited in claim 19 wherein said cyclic ether is

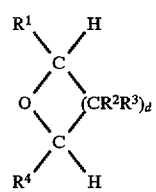

(I)

wherein d is 0, 1, 2 or 4, and each $R^1$, $R^2$, $R^3$ and $R^4$ is independently hydrogen or a hydrocarbyl containing 1 to 20 carbon atoms.

21. The process as recited in claim 20 wherein x is 2.

22. The process as recited in claim 20 wherein d is 2.

23. The process as recited in claim 19 wherein all of Z are $-OSO_2R^5$.

24. The process as recited in claim 20 wherein $R^1$, $R^4$, and all of $R^2$ and $R^3$ are hydrogen.

25. The process as recited in claim 22 wherein $R^1$ and $R^4$ are hydrogen, one of $R^2$ is hydrogen, the other $R^2$ is methyl, and both of $R^3$ are hydrogen.

26. The process as recited in claim 23 wherein $R^5$ is perfluoroalkyl.

27. The process as recited in claim 26 wherein $R^5$ is trifluoromethyl.

28. The process as recited in claim 22 wherein x is 2.

29. The process as recited in claim 21 wherein A is bis(3,3'-phenylene)methane, bis(3,4'-phenylene)methane, bis(4,4'-phenylene)methane, p-phenylene, m-phenylene, n-hexamethylene, and methyl-substituted phenylene.

30. The process as recited in claim 20 wherein A contains one or more urethane or urea groups.

31. The process as recited in claim 21 comprising the additional step of reacting remaining isocyanate groups with a diamine, diol, aminoalcohol, or water.

32. The process as recited in claim 31 wherein said water is used.

33. The process as carried out in claim 21 wherein free diisocyanate is present.

34. The process as recited in claim 33 wherein up to 5 moles of free diisocyanate per mole of isocyanate containing chain ends are present.

35. The process as recited in claim 19 wherein M is selected from the group consisting of strontium, barium, scandium, yttrium, a rare earth metal, titanium, zirconium, hafnium, chromium, molybdenum, tantalum, rhenium, iron, ruthenium, osmium, rhodium, iridium, palladium, platinum, silver, copper, mischmetall, gold, zinc, cadmium, mercury, germanium, tin, lead, arsenic, antimony and bismuth.

36. The process as recited in claim 20 wherein x is 2; d is 2; all of Z are —$OSO_2R^5$; $R^1$, $R^2$, $R^3$ and $R^4$ are all H; and A is bis(3,3'-phenylene)methane, bis(3,4'-phenylene)methane, bis(4,4'-phenylene)methane, p-phenylene, m-phenylene, n-hexamethylene, or methyl-substituted phenylene.

37. The process as recited in claim 20 wherein x is 2; d is 2; all of Z are —$OSO_2R^5$, $R^1$, one of $R^2$, $R^3$ and $R^4$ are all H and the other $R^2$ is methyl; and A is bis(3,3'-phenylene)methane, bis(3,4'-phenylene)methane, bis(4,4'-phenylene)methane, p-phenylene, m-phenylene, n-hexamethylene, or methyl-substituted phenylene.

38. The process as recited in claim 28 comprising the additional step of reacting remaining isocyanate groups with a diamine, diol, aminoalcohol, or water.

39. The process as recited in claim 36 further comprising the step of reacting remaining isocyanate groups with a diamine, diol, amino alcohol or water, optionally in the presence of additional diisocyanate that has been added.

* * * * *